(12) United States Patent
Kelly et al.

(10) Patent No.: US 6,254,369 B1
(45) Date of Patent: Jul. 3, 2001

(54) EXTRUSION DIE FOR FORMING A SKIN ON REUSABLE CONSTRUCTION MATERIAL FOR CONCRETE FORMS

(76) Inventors: Daniel M. Kelly, 48-900 Paisano Rd., Palm Desert, CA (US) 92260; Roger A. Blaney, 11636 Vista La., Yucaipa, CA (US) 92399; Richard S. Risch, 1408 W. Orange, Redlands, CA (US) 92373

( * ) Notice: Subject to any disclaimer, the term of this patent is extended or adjusted under 35 U.S.C. 154(b) by 0 days.

(21) Appl. No.: 09/173,885

(22) Filed: Oct. 16, 1998

(51) Int. Cl.[7] .................................................. B29C 47/12
(52) U.S. Cl. ............................................. 425/113; 425/461
(58) Field of Search .............................. 425/113, 133.1, 425/461, 467, 133.5

(56) References Cited

U.S. PATENT DOCUMENTS

| | | | |
|---|---|---|---|
| 3,947,173 | * | 3/1976 | Dougherty .......................... 425/113 |
| 4,669,965 | * | 6/1987 | Murakami ......................... 425/133.5 |
| 5,326,592 | * | 7/1994 | Goewey et al. ..................... 427/256 |
| 5,780,066 | * | 7/1998 | Guillemette ........................ 425/113 |

* cited by examiner

*Primary Examiner*—Harold Pyon
*Assistant Examiner*—Joseph S Del Sole

(57) ABSTRACT

Rectangular construction studs are provided with a plastic or polyethylene extrusion resin skin by extruding the plastic onto the manufactured core of the stud through a die which has been constructed to provide a substantially uniform rate of feed of extrusion materials throughout an entire flattened rectangular oblong enveloping prismatic and conforming cavity defined in the die which completely and prismatically circumscribes a rectangular core member, which is being disposed and translated through the die from a feed position in the die to its extrusion exit ports. The uniform volume feed rate is achieved through the use of a plurality of feeding risers communicating between a supply runner and an extrusion channel in the die. The enveloping prismatic and conforming cavity is primarily supplied extrusion material from primary risers located in opposing central portions of the flattened, oblong shape and is supplemented with the plurality of secondary risers opposing side portions of the enveloping prismatic and conforming cavity.

10 Claims, 5 Drawing Sheets

EXTRUSION DIE FOR FORMING A SKIN ON REUSABLE CONSTRUCTION MATERIAL FOR CONCRETE FORMS

BACKGROUND OF THE INVENTION

1. Field of the Invention

The invention relates to tooling used to make construction materials, and in particular an extrusion die to fabricate a plastic skin on materials used for concrete forms.

2. Description of the Prior Art

Concrete is a widespread and popular building material both in the developed and developing nations. One of the major material costs associated with concrete construction is the cost of the material used to build the form into which the concrete is poured. The traditional material used for concrete forms is lumber and plywood, the cost of which is steadily increasing everywhere, and is particularly acquired at a dear price in many developing nations.

In addition to the lumber and plywood, many other types of materials have been used for concrete forms, including metal sheeting and plastics, the cost of which is substantially higher than plywood and lumber, although such materials are typically more durable and may be reused more times. In most cases, lumber and plywood sheeting can be reused in different concrete forming projects, at the most, two to three times before the material becomes unusable for a variety of factors. While metal is very durable and can be reused many times, metal sheeting and bracing used to support the heavy weight of wet concrete is difficult to work with, and once deformed or bent, becomes practically unusable in any other project. While plastic sheeting and plastic structural components have durability and reusability, and can be easily worked in the field, most of these components lack the strength necessary for heavy concrete form work unless the thickness and, therefore, the cost of such materials is increased beyond the point of economic reason. In addition, many plastic materials are brittle or become brittle after relatively short exposures to the elements.

The extrusion of a plastic or polymer skin onto rectangularly cross sectioned, manufactured lumber in such a manner as to obtain close tolerances of the outer envelope and good adhesion and tight binding of the skin to the underlying lumber or substrate is nontrivial. The problem of obtaining a good lamination becomes particularly difficult when the size of the lumber increases to sizes larger than 2"×4".

Therefore, what is needed is some type of apparatus and methodology whereby plastic or polymeric skin can be economically laminated on a variety of sizes of material, particularly larger materials such as 2"×6'"s or larger, which material can be repeatedly employed in concrete form work at a low cost similar to plywood and lumber yet with a durability like plastics or metals.

BRIEF SUMMARY OF THE INVENTION

The invention is an extrusion die for providing an extruded skin on a rectangular core of a construction member comprising a die body defining a die cavity through which the core is disposed. An at least partially circumscribing runner is defined in the die body for carrying extrudable material of which the extrusion skin will be formed. An extrusion channel is defined in the die body completely circumscribing the die cavity. A plurality of risers communicates the runner and the extrusion channel so that the extrusion material is provided to the runner and uniformly distributed in the extrusion channel. A mandrel is disposed in the die cavity and forms a continuous enveloping prismatic and conforming cavity between the die body and the mandrel into which the extrusion material is provided by communication of the enveloping prismatic and conforming cavity with the extrusion channel. The enveloping prismatic and conforming cavity has an exit port which circumscribes the core as the core emerges from the die body. The extrusion material is then extruded around and onto the core to form a substantially uniform skin about the core.

The die body is comprised of two die halves. The die cavity is a rectangularly flattened oblong prismatic cavity. The enveloping prismatic and conforming cavity is a rectangularly flattened oblong cavity conformably defined with and exterior to the die cavity. The plurality of risers comprise a subplurality of primary risers and a subplurality of secondary risers. The primary risers provide communication for the extrusion material to center portions of the enveloping prismatic and conforming cavity and the secondary risers provide communication for the extrusion material to opposing side portions of the enveloping prismatic and conforming cavity. The core has a standard construction size of 1"×6" or larger and preferably a size of 2"×12" or larger.

The plurality of risers have internal diameters which are sized to permit even flow and distribution of the extrusion material throughout the enveloping prismatic and conforming cavity when the extrusion material is a polyethylene extrusion resin of medium density.

The extrusion channel is defined in the die body adjacent to a land. The extrusion material is communicated from the extrusion channel across the land into the enveloping prismatic and conforming cavity. The land has a width relative to the extrusion channel. The width of the land increases toward opposing side portions of the land as compared to the width of the land in the center of the die body in communication with the primary risers.

The invention is an extrusion die for extruding a substantially uniform skin of plastic onto a rectangular prismatic core. The extrusion die comprises a first and second identical die half. A rectangularly flattened die cavity is defined between the first and second die halves. A mandrel is disposed in the die cavity and has a mandrel body conforming to the shape of the die cavity. An extrusion channel is defined in the first and second die halves and completely circumscribes the die cavity and mandrel beginning at an extrusion feed position and extending to an extrusion port in the first and second die halves. The extrusion channel is spaced apart from the mandrel body by a land defined in the first and second die halves to thereby form an enveloping prismatic and conforming cavity from the extrusion feed position to the extrusion exit ports. A runner is defined in the first and second die halves and communicates with an inlet port defined in the first and second die halves and at least partially circumscribing the die cavity. A plurality of risers communicates the runner with the extrusion channel at a corresponding plurality of azimuthal locations about the die cavity.

The plurality of risers is comprised of a subplurality of primary risers and a subplurality of secondary risers. The primary risers are provided at an azimuthally center position of the die cavity and the secondary risers are provided at opposing azimuthal side positions of the die cavity. The primary risers have a larger inner diameter than the secondary risers. The die has a longitudinal direction and an orthogonal azimuthal direction. The plastic is extruded from the feed position to a longitudinal rearward extrusion position in the die. The die has a center azimuthal location and azimuthal side locations at the feed position. The land is defined at a more forward longitudinal position at the opposing azimuthal side locations than at the azimuthal center location so that flow resistance to the plastic is decreased at the opposing azimuthal side locations of die cavity compared to flow resistance to the plastic at the azimuthal center location.

In the illustrated embodiment the core has at least one cross sectional dimension six inches or greater and preferably 12 inches or greater. The height-to-width ratio of the core is at least 1 to 6 or less.

The invention is also a method of forming an extrusion skin about a rectangular core having a ratio of cross-sectional dimensions of at least six to one comprising disposing the core into a die cavity, and providing extrusion material to an enveloping prismatic and conforming cavity in the shape of a rectangularly flattened oblong. The enveloping prismatic and conforming cavity completely circumscribes the core in a conforming manner. The extrusion material is provided generally uniformly the enveloping prismatic and conforming cavity.

The extrusion material is provided at a plurality of azimuthal locations about the enveloping prismatic and conforming cavity. A primary amount of volume per unit of time of extrusion material is provided at opposing center positions of the enveloping prismatic and conforming cavity and a secondary amount of volume per unit of time of extrusion material is provided at azimuthally opposing side portions of the enveloping prismatic and conforming cavity. The primary amount of volume per unit of time of extrusion material at opposing center positions is provided through the two opposing risers communicated to the enveloping prismatic and conforming cavity. The secondary amount of volume per unit of time of extrusion material is provided through four smaller risers at opposing azimuthally arranged positions communicating with the enveloping prismatic and conforming cavity. The four smaller risers are arranged in two opposing pairs, one on each opposing side of the enveloping prismatic and conforming cavity.

The method further comprises reducing flow resistance to the extrusion material into the enveloping prismatic and conforming cavity at the azimuthally opposing side portions of the enveloping prismatic and conforming cavity as compared azimuthal central portions of the enveloping prismatic and conforming cavity.

The invention and its various embodiments may be better visualized by now turning to the following drawings wherein like elements are referenced by like numerals.

The invention may now be better understood by turning to the following detailed description.

DETAILED DESCRIPTION OF THE PREFERRED EMBODIMENTS

Rectangular construction studs are provided with a plastic or polyethylene extrusion resin skin by extruding the plastic onto the manufactured core of the stud through a die which has been constructed to provide a substantially uniform rate of feed of extrusion materials throughout an entire flattened rectangular oblong enveloping prismatic and conforming cavity defined in said die which completely and prismatically circumscribes a rectangular core member, which is being disposed and translated through said die from a feed position in said die to its extrusion exit ports. The uniform volume feed rate is achieved through the use of a plurality of feeding risers communicating between a supply runner and an extrusion channel in said die. The enveloping prismatic and conforming cavity is primarily supplied extrusion material from primary risers located in opposing central portions of the flattened, oblong shape and is supplemented with the plurality of secondary risers opposing side portions of said enveloping prismatic and conforming cavity.

Before describing the tooling used to make the construction member, first consider the construction member itself and the apparatus by which the skin is applied to form the completed construction member. The reusable, economically fabricated composite construction member is preferably intended for use in concrete form work. The member is comprised of a core made from previously unused or recycled wood products which is disposed and fully encased within a plastic extruded skin. The wood core serves as a substrate around which the plastic skin is hot extruded through a die. The core has a rectangular cross section like conventional lumber products. The construction member is fabricated in a variety of sizes and lengths to substantially match conventional lumber products, for example, the same or similar sizes to standard lumber in the sizes of 1"×4", 1"×6", 1"×8", 2"×2", 2"×4", 2"×6", 2"×8", 2"×10", and 2"×12" and custom sizes. Although the construction material discussed here is used for concrete forms, its use is arbitrary and can be used anywhere where structural members as needed, such as fences, street barricades and sides for stake bed trucks.

Figure 1:
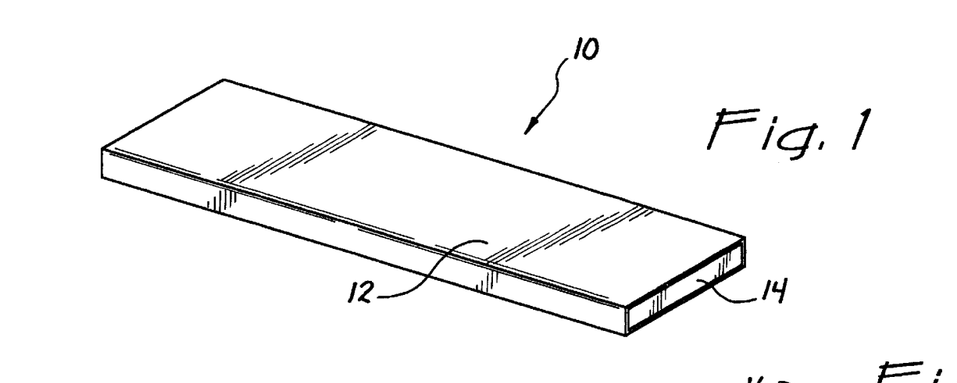
FIG. 1 is a perspective view of the construction member fabricated using the tooling of the invention.

FIG. 1 is a perspective view of a concrete form member, generally denoted by reference numeral 10, in which a synthetic or plastic integral skin 12 has been provided with a wood core 14. Core 14 is fixed to skin 12 within the inner surface of skin 12 to provide a solid, rigid structural member, which in the skin of the embodiment of FIG. 1, is in the form of a 2×6 stud. Skin 12 in the illustrated embodiment is a plastic skin with a rectangular cross section having an inside dimension of approximately 1.5×5.5 inches. The wall thickness of skin 12 is approximately 0.045 inch. Wood core 14 is similarly a solid, rigid elongated structural member conforming to the inside shape and dimensions of skin 12. Core 14, therefore, also has an outside diameter of approximately 1.5×5.5 inches, and in the illustrated embodiment, is made from compressed recycled cellulose products, typically saw mill wood scraps and previously unused timber such as is manufactured under the trademark, TIMBER STRAND, by Trussjoist Corporation of Minneapolis, Minn.

In the preferred embodiment skin 12 is made from a polyethylene extrusion resin of medium density, which is conventionally used to coat high pressure, nonporous pipes, municipal potable water pipes, fuel gas pipes, industrial and mining pipes, storm and sanitary sewer pipes and used for relining pipe and coatings for steel pipe. The elasticity of the resin used for skin 12 and its density at extrusion temperatures are material parameters, which can affect the suitability of the material for use as skin 12. Appropriate values for these parameters can be chosen by experiment for any given size of member 10. Polyethylene extrusion resins, which are used for the foregoing applications, are generally suitable. Therefore, structural member 10 of FIG. 1 is preferably made entirely from environmentally safe, recycled or otherwise commercially unusable materials.

Figure 2:
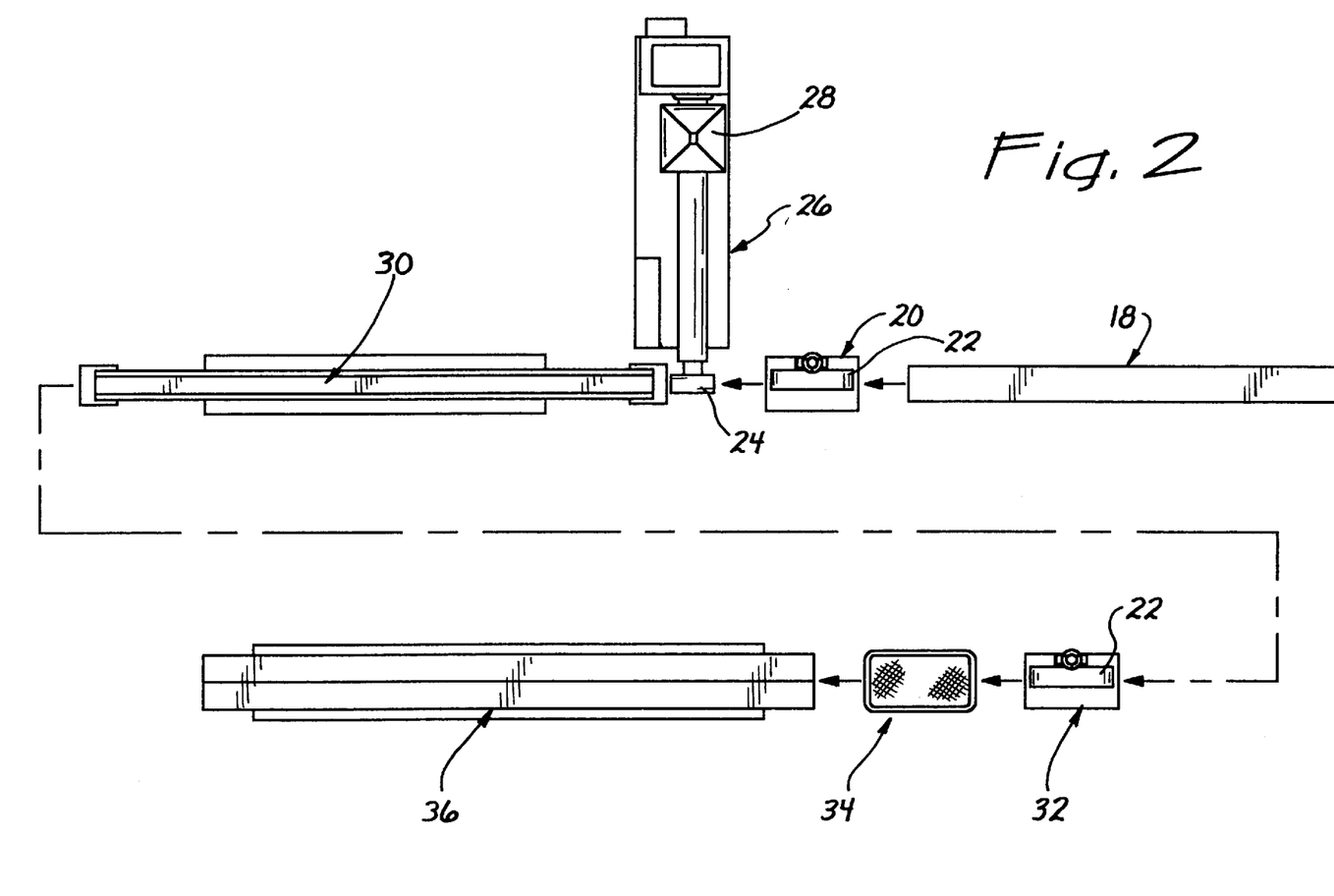
FIG. 2 is a top elevational view of the apparatus in which the construction member of FIG. 1 is fabricated.
Figure 3:
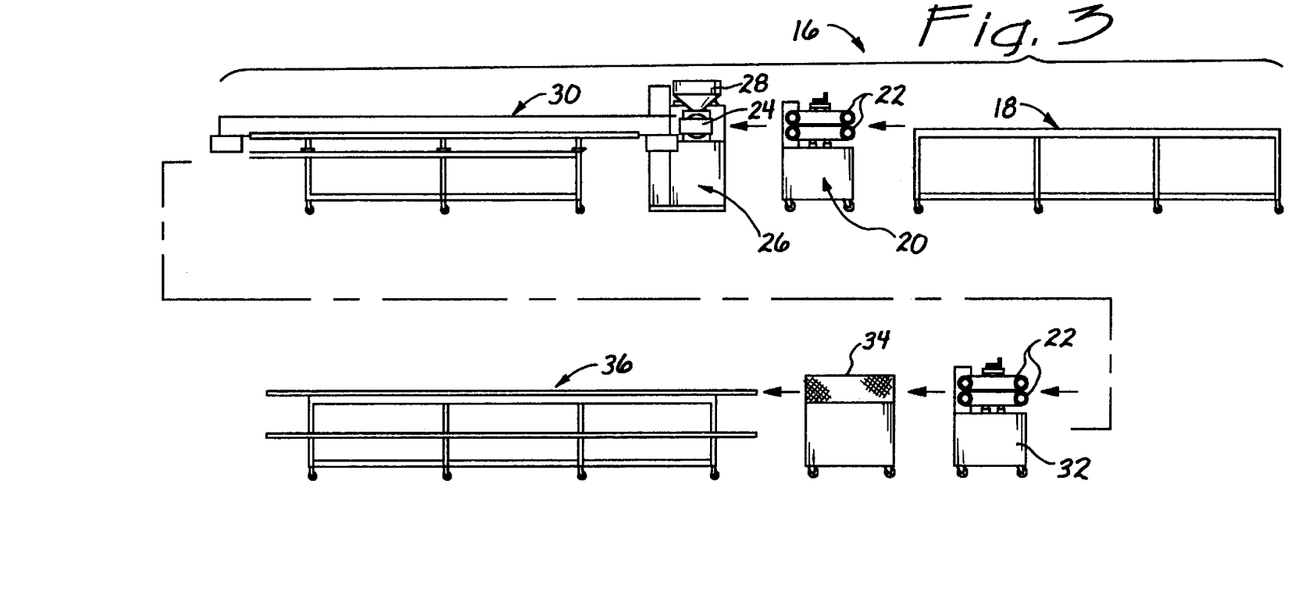
FIG. 3 is a side elevational view of the apparatus in which the construction member of FIG. 1 is fabricated.

Turn now to FIGS. 2 and 3 wherein an apparatus, generally denoted by reference numeral 16, is shown for extruding skin 12 around core 14, which may have a length typically in the range of 16 to 20 feet. Any size and length of member 10 consistent with the teachings of this invention may be used.

FIG. 2 is a top elevational view and FIG. 3 a side elevational view of apparatus 16 in which construction member 10 is provided with the extruded skin 12. Core 14 of construction member 10 (not shown in FIGS. 2 and 3) is provided on a board feed conveyor 18 shown to the right in FIGS. 2 and 3. Core 14 is provided to a board feed pull/push unit 20 which includes a pair of adjustable endless conveyor belts 22 between which core 14 is set. Conveyor belt 22 provide a means of advancing or retracting core 14 from board feed conveyor to die 24 of extruder unit 26. The tooling of the invention is included within die 24 and will be described below in greater detail with the following Figures. Die 24 is provided by extruder unit 26 with the hot polyethylene resin by conventional means, typically supplied through a supply hopper 28.

By means described below, skin 12 is extruded on to core 14 as it emerges from the left side of die 24 as shown in FIGS. 2 and 3 and is advanced into a recirculating water bath cooling unit 30. Water is sprayed onto cooling and contracting skin 12 as a carrying construction member 12 proceeds through a water spray or sprinkler system bath included within unit 30. The details of the sprinkler and the water recirculation system within sprinkler unit 30 is conventional and will not be further detailed here.

The cooled and cured construction member 10 emerges from the end of water bath cooling unit 30 and is automatically engaged by board feed pull/push unit 32 which is similar to board feed pull/push unit 20 in that it has an adjustable pair of conveyor belts 22 between which construction member 10 is frictionally grasped in advance to the left as shown in FIGS. 2 and 3.

Construction member 12 is then advanced by unit 32 and fed to an automatic traveling cutoff saw unit 34 which will cut construction member 10 to desired length. The cured, finished and cut construction member 10 is then fed onto a dump table 36 where it is accumulated from which it is taken to manufactured inventory storage. The fabrication system shown in FIGS. 2 and 3 is shown only by way of example and it is not intended to limit the invention in any way, but only to provide one possible description of the context in which the die of the invention may be used.

Figure 4:
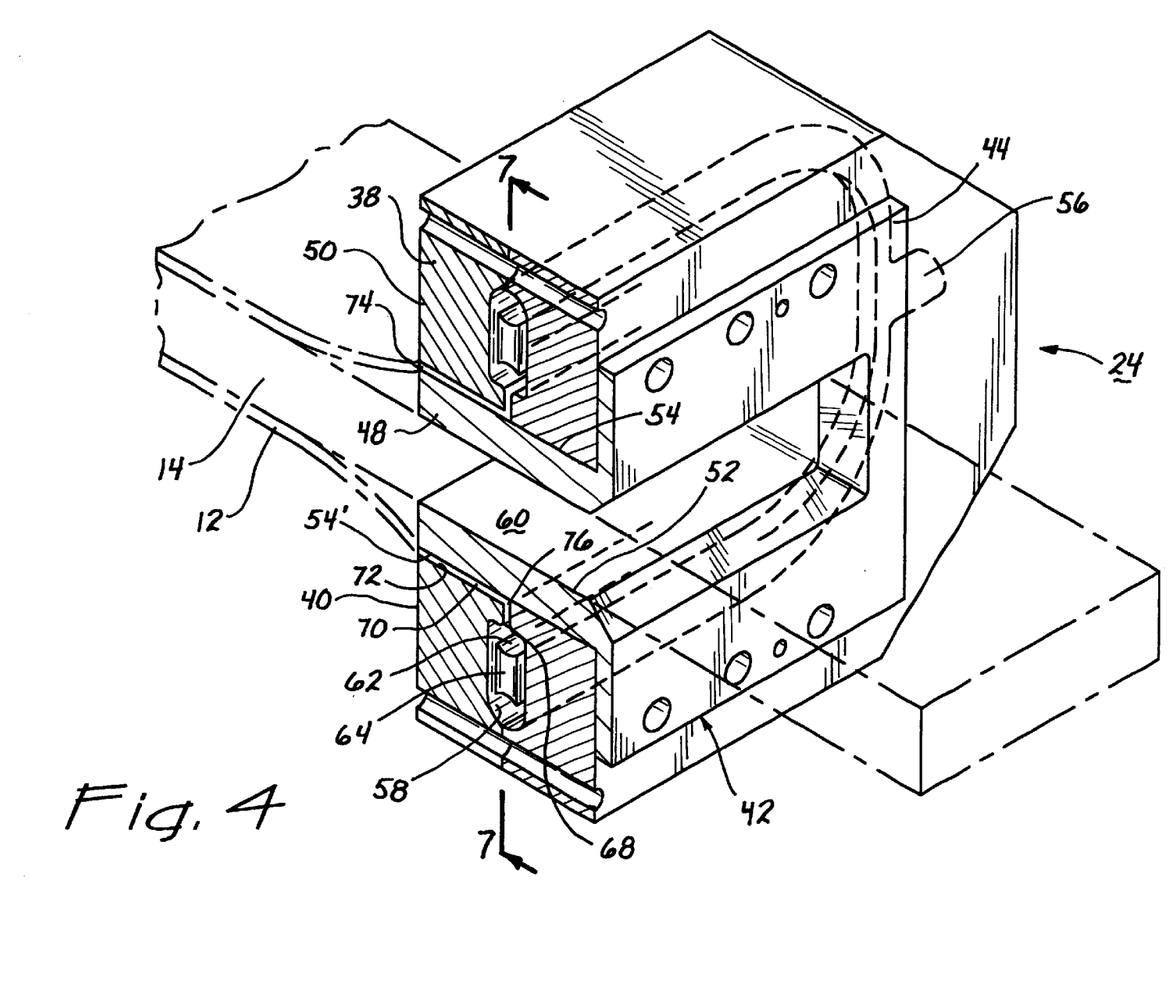
FIG. 4 is a side cutaway perspective view of the assembled die of the invention.
Figure 5:
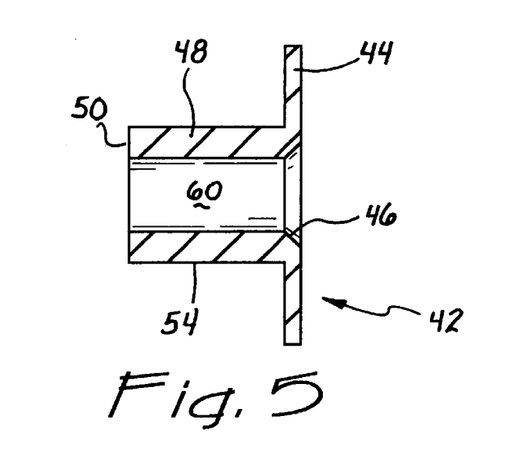
FIG. 5 is a longitudinal cross-sectional view of the mandrel disposed between the two die halves shown in FIG. 4.
Figure 6:
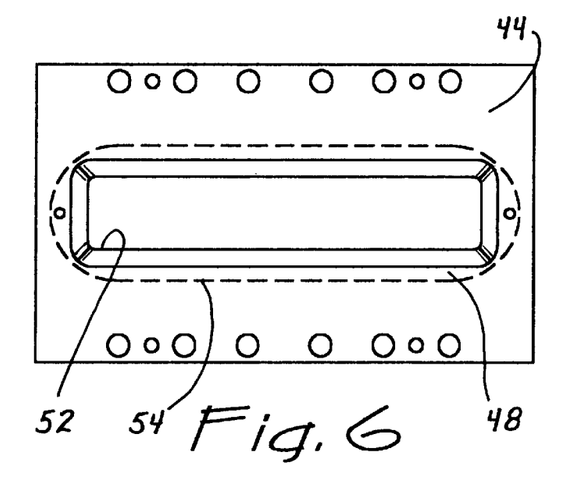
FIG. 6 is a front elevational view of the mandrel of FIG. 5.

Die 24 is comprised of the components shown in FIGS. 4–8, which in the illustrated embodiment is used for 2×12 lumber sizes and smaller. The length of width to thickness, namely 1 to 6 and less, may be the more relevant parameter for characterization of the illustrated embodiment. It is to be understood that even larger thickness-to-width ratios may be accommodated by making appropriate sizing and die design modifications to that described in connection with the illustrated embodiment by following the spirit of the teachings of the invention. Die 24 is comprised of two halves 38 and 40 shown in FIG. 4 into which a mandrel 42 is longitudinally disposed. As shown in FIG. 5 in cross-sectional view mandrel 42 is comprised of a facing 44 through an appeture 46 has been defined into which core 14 is inserted. A mandrel body 48 extends from facing 44 between die halves 38 and 40 to the opposing rear end 50 of die 24. The inner surface 52 of mandrel body 48 is generally rectangular as best seen in the front elevational view of FIG. 6. An exterior surface 54 of mandrel body 48 is a rectangularly flattened oblong shape as shown in FIG. 6. As will be described below, hot resin is inserted between exterior surface 54 of mandrel body 48 and certain structures provided in die halves 38 and 40. In the illustrated embodiment as shown in the cross-sectional view of FIG. 5, the exterior surface 54 of mandrel body 48 is uniform and prismatic from front facing 44 to rear end 50.

Figure 7:
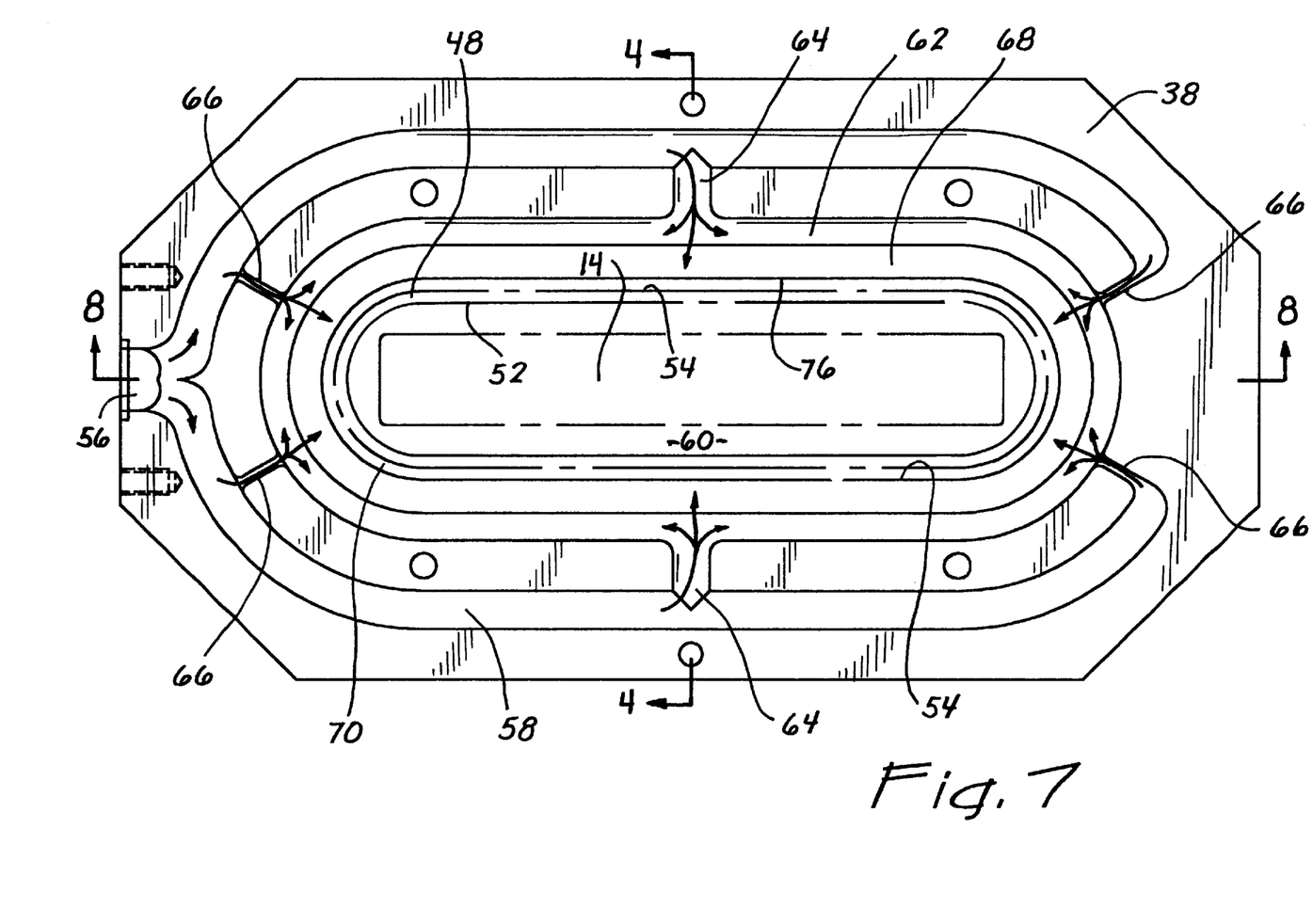
FIG. 7 is a perpendicular cross-sectional view taken through the die halves as seen in the assembled die.

FIG. 7 is a perpendicular cross-sectional view taken through die halves 38 and 40 to form completed die 24. Die 24 is characterized by an inlet port 56 collectively defined by die halves 38 and 40. Inlet port 56 is communicated with a runner 58 in each of die halves 38 and 40 which extends through the body of the die halves and which partially encircles die cavity 60. Mandrel body 48 is disposed into die cavity 60 and has been omitted from the depictions of FIGS. 7–8 for the sake of clarity. Thus, runner 58 forms a partial ring through which hot extrusion resin is flowed under pressure from extrusion unit 26. Hot resin is then distributed to a extrusion channel 62 shown in FIG. 7 which completely encircles die cavity 60. Communication between runner 58 and channel 62 is by means of a plurality of interconnecting risers 64 and 66. Main risers 64 communicate with the middle of extrusion channel 62 as best shown in the cross sectional view of FIG. 7 thereby distributing hot resin as symbolically shown by the arrows in FIG. 7 to both the left and right sides of both die halves 38 and 40 into extrusion to channel 62 and across adjacent land 68. Secondary risers 66 are provided in pairs in both die halves 38 and 40 in the vicinity of the left and right sides of the die halves. Hot resin is thus also communicated from runner 58 through secondary risers 66 into extrusion channel 62 and across adjacent land 68. Secondary risers 66 are provided in order to insure an even and adequate flow to the entire azimuthal volume defined by extrusion channel 62 and contiguous land 68.

As best shown in FIG. 4 the width of land 68 and approximately half the radius of extrusion channel 62 defines a gap 70 which extends from the extrusion feed position in die 24 of extrusion channel 62 to the rear end 50 of die 24, which gap 70 completely encircles die cavity 60 and is defined on its outer surface 72 by die halves 38 and 40 and on its inner surface by surface 54 of mandrel body 48. Forward of the extrusion feed position defined by channel 62 within die halves 38 and 40, no gap or channel is defined between die halves 38 and 40 and mandrel body 48. Instead, the forward inner surface 54' of die halves 38 and 40 is closely fit and intimately adjacent to exterior surface 54 of mandrel body 48 leaving no functional gap between them. Thus, hot resin is uniformly distributed in a ring around die cavity 60 through which core 14 is being fed and extends backwardly as a cylindrical envelope to rear end 50 in a flattened rectangular oblong shape until it is extruded from ports 74 which are defined as the opening to channel 70.

The diameters of primary riser 64 and secondary riser 66 are chosen according to empirical judgment as determined by the size of the resin oblong envelope being developed within channel 70, its elasticity, viscosity and density. The object to provide an extruded skin which will continuously exit from ports 74 and envelope core 14 as it is extended from die 24. The hot resin contacts and shrinks down on core 14 to form skin 12 with a substantially uniform coverage and thickness above the entire rectangular surface of core 14.

Figure 8:
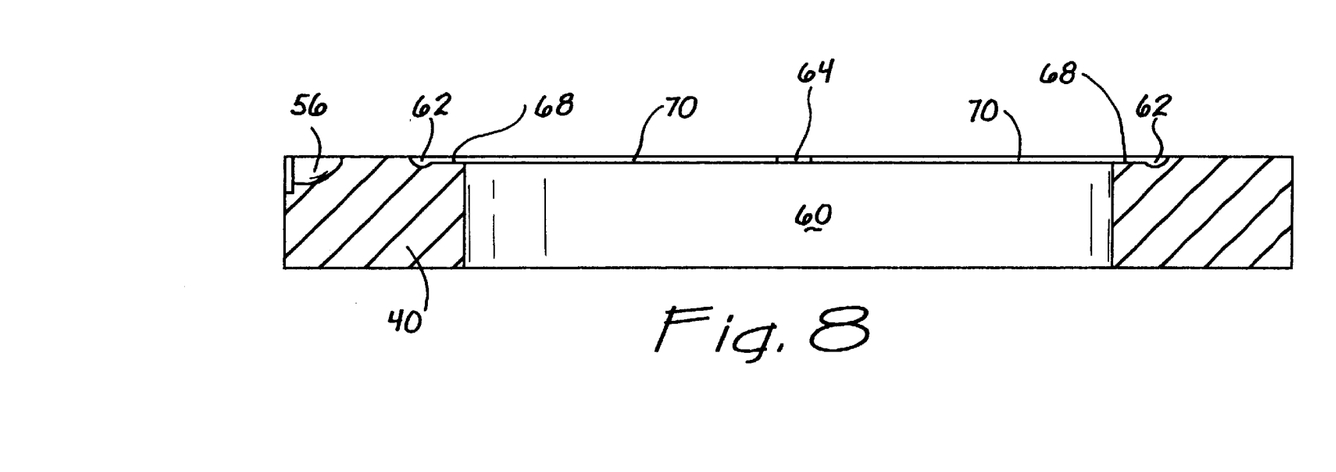
FIG. 8 is a cross sectional view as seen through die 24 on section lines 8—8 of FIG. 7.

FIG. 8 is a cross sectional view as seen through die 24 along section lines 8—8 of FIG. 7. For the sake of simplicity, only one die half 40 is depicted. Inlet 56 and extrusion channel 62 and land 68 are clearly shown in the cross section. The opening to primary riser 64 is visible in the center of the view. Also shown is the cross sectional view of edge 76 of land 68. FIG. 8 depicts in exaggerated form a thinning of the width of land 68 in the center of die half 40 near primary riser 64. The depth of land 68 smoothly increases as it moves exteriorally to the left and right of center as shown in FIG. 8 until it communicates with extrusion channel 62. This difference in the width of land 68 results in the channel 70 widening as it moves exteriorally to the left and right, and, thus, provides a slightly enhanced resistance to the resin flow at the center as compared to the flow resistance at the left and right ends of extrusion channel 62 adjacent to the lateral sides of cavity 60. In the illustrated embodiment the increase of land width is approximately less than an inch, but other values can be chosen based on empirical selection.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An extrusion die for extruding a substantially uniform skin of plastic onto a rectangular prismatic core comprising:
   a first and second identical die half;
   a rectangularly flattened die cavity defined between said first and second die halves;
   a mandrel disposed in said die cavity having a mandrel body conforming to the shape of said die cavity;
   an extrusion channel defined in said first and second die halves completely circumscribing said die cavity and mandrel beginning at an extrusion feed position and extending to an extrusion port in said first and second die halves;
   wherein said extrusion channel is spaced apart from said mandrel body by a land defined in said first and second die halves to thereby form an enveloping prismatic and conforming cavity from said extrusion feed position to said extrusion port, said enveloping prismatic and conforming cavity increasing in width as it extends from a center of the land to sides of the land;
   a runner defined in said first and second die halves, said runner connecting with an inlet port defined in said first and second die halves, said runner at least partially circumscribing said die cavity; and
   a plurality of risers connecting said runner with said extrusion channel at a corresponding plurality of azimuthal locations about said die cavity.

2. The extrusion die of claim 1 wherein said die has a longitudinal direction and an orthogonal azimuthal direction, said plastic being extruded from said feed position to a longitudinal rearward extrusion position in said die, said die having a center azimuthal location and azimuthal side locations at said feed position, said land being defined at a more forward longitudinal position at said opposing azimuthal side locations than at said azimuthal center location so that flow resistance to said plastic is decreased at said opposing azimuthal side locations of die cavity compared to flow resistance to said plastic at said azimuthal center location.

3. The extrusion die of claim 1 wherein said plurality of risers is comprised of a subplurality of primary risers and a subplurality of secondary risers, said primary risers being provided at an azimuthally center position of said die cavity and said secondary risers being provided at opposing azimuthal side positions of said die cavity.

4. The extrusion die of claim 3 wherein said primary risers have a larger inner diameter than said secondary risers.

5. An extrusion die for providing an extruded skin on rectangular core of a construction member comprising:
   a die body defining a die cavity through which said core is disposed;
   a runner at least partially circumscribing a die cavity, said runner defined in said die body for carrying extrusion material of which said extruded skin will be formed;
   an extrusion channel defined in said die body completely circumscribing said die cavity;
   a plurality of risers connecting said runner and said extrusion channel so that said extrusion material is provided to said runner and uniformly distributed in said extrusion channel; and
   a mandrel disposed in said die cavity and a continuous enveloping prismatic conforming cavity is formed between said die body and said mandrel into which said extrusion material is provided by said extrusion channel, said enveloping prismatic and conforming cavity having an exit port which circumscribes said core as said core emerges from said die body, said enveloping prismatic and conforming cavity increasing in width as it extends from a center of said die body to sides of the die body, said extrusion material then being extruded upon said core in a skin about said core.

6. The extrusion die of claim 5 wherein said die body is comprised of two die halves.

7. The extrusion die of claim 5 wherein said plurality of risers comprises a subplurality of primary risers and a subplurality of secondary risers, said primary risers providing connection for said extrusion material to center portions of said enveloping prismatic and conforming cavity and said secondary risers providing connection for said extrusion material to opposing side portions of said enveloping prismatic and conforming cavity.

8. The extrusion die of claim 5 wherein said plurality of risers have internal diameters which are sized to permit even flow and distribution of said extrusion material throughout said enveloping prismatic and conforming cavity when said extrusion material is a polyethylene extrusion resin of medium density.

9. The extrusion die of claim 5 wherein said die cavity is a rectangularly flattened oblong prismatic cavity.

10. The extrusion die of claim 9 wherein said enveloping prismatic and conforming cavity is a rectangularly flattened oblong cavity conformably defined with and exterior to said die cavity.

* * * * *